2,837,564
SELECTIVE DECARBOXYLATION PROCESS

Raymond Wynkoop, Metuchen, N. J., and John J. Giachetto, La Romana, Dominican Republic, assignors to National Distillers and Chemical Corporation, New York, N. Y., a corporation of Virginia No Drawing. Application November 15, 1955
Serial No. 547,011

7 Claims. (Cl. 260—533)

The present invention relates broadly to a process for treatment of mixtures of carboxylated compounds comprising dibasic acids to facilitate recovery of the desired dicarboxylic acids in substantially pure form from such mixtures. More particularly, the invention relates to a process for selective decarboxylation of certain undesired carboxylated derivatives in mixture with desired dicarboxylic acids formed in processes for carbonation of alkali metal derivatives of hydrocarbons to produce alkali metal salts of desired dicarboxylic acids that are convertible to the corresponding desired free acids. In more specific embodiment, the invention relates to a process for preparation of alkali metal derivatives of dimers of conjugated dienes which may be carbonated to alkali metal salts of desired dicarboxylic acids having two more carbon atoms per molecule than the dimers and which salts of the desired acids may then be hydrogenated to form the corresponding saturated salts of the desired free dicarboxylic acids.

In the carbonation of dialkali metal derivatives of aliphatic hydrocarbons, such as the dialkali metal derivatives of dimers of conjugated dienes, the carbonation may be carried out by treatment of the alkali metal derivatives with carbonating agents such as gaseous carbon dioxide, Dry Ice, and the like. In such processes, it is desirable to produce carbonated products that can be subsequently converted to free acids of desired type. In certain instances, however, undesired side reactions tend to occur during the carbonation treatment whereby the reaction mixture comprises, in addition to the desired products, carbonated products different therefrom and which it is desirable to remove so as to facilitate obtainment of the desired products in improved purity and/or yield. For purposes of illustration, a conjugated diene may be reacted under certain conditions with an alkali metal in finely dispersed form to produce, as desired products, the dialkali metal derivatives of dimers of the conjugated diene. In the use of butadiene for reaction with sodium in finely dispersed form, the reaction mixture comprises the disodio derivatives of dimers of butadiene. Upon carbonation of the reaction mixture comprising the dialkali metal derivatives of such dimers, the dialkali metal derivatives are converted to the dialkali metal salts of dicarboxylic acids having two more carbon atoms per molecule than the dimer. Thus, and again using for illustration the products prepared by initial reaction of butadiene with sodium, carbonation of the resulting mixture produces a carbonated reaction mixture comprising as desired products, the dialkali metal salts of dicarboxylic acids having two more carbon atoms per molecule than the dimers of butadiene. Such carbonated reaction mixtures, upon being subjected to hydrogenation, produce mixtures comprising, as desired products, the salts of $C_{10}$ acids such as sebacic acid, 2-ethylsuberic acid and 2,2'-diethyladipic acid. However, in the course of the carbonation step, there are unavoidably formed certain side reaction products which should desirably be removed from the mixture with the desired acids or derivatives thereof. For example, in the reaction of butadiene with finely dispersed sodium to prepare a reaction mixture comprising the disodio derivatives of butadiene dimers, followed by carbonation thereof, certain side reactions tend to occur with formation of carboxylated derivatives different than the desired dicarboxylic acid derivatives and, to, facilitate ultimate recovery of the desired derivatives in substantially pure form, the undesired carboxylated products should be substantially removed and, preferably, without substantial, if any, degradation of the desired components. Thus, a primary object of this invention is to provide a process for effective removal of undesired carboxylated products from mixtures thereof with desired dicarboxylic acids, and, particularly, the effective removal of undesired carboxylated products unavoidably formed in the carbonation of mixtures produced by initial reaction of an alkali metal and a conjugated diene as aforedescribed.

In its broad aspect, the invention comprises subjecting a mixture comprising dibasic acids and derived from carbonation of dialkali metal derivatives of hydrocarbons, to a controlled treatment whereby undesired carboxylated products present in such a mixture are selectively decarboxylated to convert the undesired products to materials readily removable from the mixture, thereby facilitating recovery of desired dicarboxylic acids. More particularly, the treatment embodied herein comprises subjecting the mixture to a treatment under conditions of temperature and pressure controlled so as to selectively decarboxylate the undesired products without substantial, if any, decarboxylation or other degradation of the desired dicarboxylic acids. In general, the desired results as embodied herein may be obtained by subjecting the mixture to a relatively low pressure-medium temperature treatment that may be carried out at from about 100 to about 300° F. and a pressure of from about 10 to about 200 mm. (Hg). As to the period of time employed for carrying out the treatment, it may be varied to meet particular requirements; for example, the treatment may be carried out for a short period of time such as to approach conditions obtainable in a continuous fractionation; or under extremely slow distillation conditions, as in batch distillation, in which case the distillation may be carried out over a period of several hours. However, and for most purposes, the treatment may be carried out, particularly in continuous manner, by use of a time period that may be varied from about five minutes to about twenty minutes. As a preferred embodiment, the selective decarboxylation treatment may be carried out continuously at a pressure of about 150 mm., a temperature of about 250 to 300° F. and a contact time of about 10 minutes. It has been found that, by subjecting acid mixtures as aforedescribed to such a controlled treatment, the undesired carboxylated derivatives are selectively decarboxylated whereby the desired dicarboxylic acids are recoverable in substantially pure form as intermediate distillate fractions, whereas the carbon dioxide (from decarboxylation) and low boiling materials that may have been used as solvents, diluents, etc. are removed as overhead products, and the products which have been selectively decarboxylated, though generally removed as a bottoms fraction, may, in certain cases, be converted to light products that may be wholly or partially taken off in the overhead fraction. Removal of such products in the overhead fraction is generally desirable in instances wherein the decarboxylated products undergo fragmentation to low boiling materials.

As aforesaid, the process embodied herein has particular application to treatment of mixtures produced by a process as aforedescribed using in the initial reaction an alkali metal and a conjugated diene as reactants. Thus, the invention may be carried out with reaction mixtures produced by carbonation of reaction mixtures from initial reaction between an alkali metal in finely dispersed form and conjugated diene such as butadiene, isoprene, dimetheylbutadiene, pentadienes, and the like. However, for illustrative purposes, the invention is further described by use of reaction products prepared from initial reaction of butadiene with sodium in finely dispersed form under conditions of reaction whereby selective dimerization occurs to produce, in selective manner and in high yields, desired disodiooctadienes that are subjected to carbonation to produce carbonated mixtures from which it is desired to produce and facilitate recovery of resulting $C_{10}$ saturated aliphatic acids such as sebacic acid, 2-ethylsuberic acid and 2,2'-diethyladipic acid and all of which have a theoretical neutralization equivalent of 101.12.

An agitated reactor was partially immersed in a solid carbon dioxide-methanol cooling bath sufficient to hold the temperature withing the range of $-20$ to $-30°$ C. A reflux condenser was attached to the mouth of the reactor and a nitrogen blanket was provided throughout the reaction period. Into the reactor there was placed about 1280 parts of dimethyl ether to which was added 6 parts of para-terphenyl. About 138 parts of sodium in the form of a 50° dispersion in refined kerosene was then added. Approximately 356 parts of butadiene was then introduced into the reactor at a uniform rate over a period of 254 minutes. During this reaction period, the temperature of the reaction mixture was controlled at $-25$ to $-30°$ C. The reaction proceeded rapidly and appeared to be complete almost as soon as the butadiene addition was completed. This resulted in a slurry comprising predominantly a mixture of disodiooctadienes. The reaction mixture was then subjected to carbonation by adding it to an excess of carbon dioxide in dimethyl ether at about $-30°$ C. This procedure yielded a white slurry consisting substantially of mixed sodium salts of $C_{10}$ dicarboxylic acids. The excess carbon dioxide and dimethyl ether were allowed to evaporate, leaving behind an essentially dry mixture comprising sodium carboxylates. The substantially dry mixture was dissolved in an excess of hot water, hydrogenated to saturate the sodium salts of the unsaturated acids, and the organic acids freed by acidification of the aqueous mixture with sulfuric acid in presence of toluene whereby there resulted a toluene phase comprising in solution the organic acids liberated from their sodium salts. The toluene phase was then subjected to fractional crystallization to first remove a major portion of the sebacic acid content and then to crystallize out a fraction comprising the 2-ethylsuberic acid, 2,2'-diethyladipic acid and a small amount of sebacic acid, with the major amount by weight of the fraction comprising the branched chain acids, namely, 2-ethylsuberic and 2,2'-diethyladipic. The later mixture of acids was then washed with hexane.

In endeavors to recover substantially pure $C_{10}$ saturated aliphatic diacids from said mixture of acids, it was found that sharp separations and high recoveries were not readily obtainable by use of conventional means such as solvent extraction and fractional crystallization from organic materials such as toluene, hexane, benzene, and the like, as the desired $C_{10}$ acids recoverable therefrom were found to contain other carboxylated products which were so similar in extractibility characteristics, solvency, etc. to the desired acids that their removal from mixtures with the desired acids was rendered difficult even upon resort to extensive separation operations.

In accordance with this invention, the mixture comprising the desired $C_{10}$ saturated aliphatic diacids (2-ethylsuberic, 2,2'-diethyladipic and sebacic) was pretreated by heating to 120° C. at a pressure of 10 mm. for ½ hour during which time evolution of carbon dioxide occurred, and fractionally distilling the thus treated product. The following tabulation sets forth data obtained from the described treatment of the acid mixture.

| Cut No. | Weight | Equivalents | Neutralization Equivalent |
|---|---|---|---|
| 1 | 16 grams | 0.096 | 166.4 |
| 2 | 243 grams | 2.320 | 105.0 |
| 3 | 249 grams | 2.420 | 102.6 |
| 4 | 991 grams | 9.650 | 102.9 |
| 5 | 569 grams | 5.520 | 102.2 |
| 6 | 144 grams | 1.395 | 103.5 |
| Residue | 469 grams | 3.800 | 123.0 |
| $CO_2$ | 77 grams | 1.750 | 44.0 |
| Charge | 2,763 grams | 26.50 | 103.0 |
| Total Recovery | 2,758 grams | | |
| Loss | 5 grams | | |
| Percent Loss | 0.18% | | |
| Equivalents Recovered | | 26.95 | |

As will be observed from the foregoing, the recovery of 2,758 grams from the 2,763 gram charge amounted to substantially complete accountability for the acid mixture subjected to the described treatment. Of the fractions recovered as intermediate distillate fractions, namely cuts 2 to 6, inclusive, their neutralization equivalents evidence that they consisted of substantially pure $C_{10}$ aliphatic saturated diacids (theoretical neutralization equivalent of 101.12). The relatively large amount of $CO_2$ formed during the treatment obviously is not attributable to partial or total decarboxylation of $C_{10}$ diacids as, if such decarboxylation had occurred, formation of hydrocarbons or monoacids (such as pelargonic acid) would have resulted. If such formation of hydrocarbons had occurred, they would have been recovered as light ends having no acid value; and if partial decarboxylation of $C_{10}$ diacids to monoacids (e. g., pelargonic acids) had occurred, there would have resulted a light end cut (Cut 1) at least equal in equivalents to the $CO_2$ yield. However, since the total equivalents (0.096) in the light and monoacid cut (Cut 1) were very substantially less than the $CO_2$ yield (1.750 equivalents), it is obvious that partial decomposition of the desired $C_{10}$ diacids did not occur. Thus, and in view of the aforeshown accountability of equivalents and substantially complete recovery based on the charge, the substantial yield of $CO_2$ is clearly attributable to selective decarboxylation of carboxylated materials, other than the desired $C_{10}$ saturated aliphatic acid, present in the acid mixture subjected to the defined treatment. By such treatment, not only are the undesired carboxylated materials selectively decarboxylated without substantial, if any degradation of the desired materials, but additionally, the desired materials are recovered in a form which, though substantially pure, are rendered susceptible to still further purification, if desired, by means such as solvent extraction, fractional crystallization, etc. that are not generally effective for obtainment of desired acids of high purity in absence of the treatment embodied herein.

With reference to the embodiment wherein the mixture subject to the defined treatment is obtained by carbonation of a mixture resulting from initial reaction between an alkali metal in finely dispersed form and a conjugated diene, such as butadiene, under selected conditions for ultimate production of isomeric mixtures of desired diacids containing two more carbon atoms than the dimer of the conjugated diene, the initial reaction may be carried out with an alkali metal, preferably sodium, although other alkali metals such as potassium may be employed either alone or in mixture with sodium. Moreover, mixtures of sodium or potassium with other metals such as calcium can also be used. In carrying out such a metalation reaction, it is necessary that the alkali metal be used initially in a finely divided form and, generally, as a fine dispersion in a suitable reaction medium. A dispersion of the alkali metal having an average particle size of less than 50 microns is quite satisfactory for carrying out the process, with a preferred size range being five to fifteen microns. The dispersion may be conveniently prepared in an inert hydrocarbon as a separate step preliminary to the metalation reaction with the conjugated diene.

In the aforesaid process, the metalation reaction is carried out in a reaction medium consisting essentially of an ether of a particular class of ethers that appear to possess the common property of serving as promoters of the selective dimerization reaction involved. The ether can be any aliphatic monoether having a methoxy group, in which the ratio of the number of oxygen atoms to the number of carbon atoms is not less than 1:4. Examples include dimethyl ether, methyl ethyl ether, methyl n-propyl ether, methyl isopropyl ether, and mixtures of such methyl ethers. Certain aliphatic polyethers are also quite saitsfactory. These include the acyclic and cyclic polyethers which are derived by replacing all of the hydroxyl hydrogen atoms of the approximate polyhydric alcohol by alkyl groups. Typical examples are the ethylene glycol dialkyl ethers such as the dimethyl, methyl ethyl, diethyl, and methyl butyl ethers. The simple methyl monoethers, as dimethyl ether, and the dimethyl and diethyl ethers of ethylene glycol are preferred. The ethers employed should not contain any groups such as hydroxyl, carboxyl and the like which are distinctly reactive towards an alkali metal such as sodium. Although the ether may react in some reversible manner, it must not be subject to extensive cleavage as cleavage action destroys the ether, uses up sodium and introduces, into the reacting system, alkali metal alkoxides which, in turn, tend to induce rubber-forming reactions (polymerization) rather than the desired dimerization reaction. Although the reaction medium should consist essentially of the specific ethers, other inert media can be present in limited amounts. In general, these inert media will be introduced with the sodium dispersion as the liquid in which the alkali metal is suspended and will act chiefly as diluents. The concentration of ether in the reaction mixture should at all time be maintained at a sufficient level to have a substantial promoting effect upon the desired dimerization reaction.

It is usually desirable to include in the dimerization reaction mixture at least one supplementary activating material. This material is a relatively small amount of at least one material from the class of polycyclic aromatic compounds. By this term it is intended to include both condensed ring hydrocarbons such as naphthalene and phenanthrene, as well as the uncondensed polycyclic compounds such as diphenyl, the terphenyls, dinaphthyl, tetraphenyl ethylene, and the like. The polyphenyl compounds such as diphenyl and the terphenyls and their mixtures have been found to be particularly useful. The amount of the hydrocarbon to be used will vary over a range which in every case will be relatively small in comparison with the amount of butadiene undergoing reaction. Concentrations in the range of 1 to 10 weight percent based on the amount of butadiene are ordinarily quite sufficient.

In such a process, the reaction temperature is preferably held below 0° C. with a more preferred temperature range being between −20 to −50° C. Generally speaking, all ethers begin to yield cleavage products at temperatures of about 0°C. and above with the result that sufficient alkoxides are formed to yield high polymeric acids rather than the desired low molecular weight dimers.

In one typical method for carrying out the aforedescribed process, the alkali metal (e. g., sodium) dispersion is initially prepared by placing an inert hydrocarbon such as isooctane in a suitable vessel with the appropriate amount of sodium. The mixture is heated in a surrounding bath or otherwise until the sodium has melted (M. P., 97.5° C.). Then a suitable high speed agitator is started and, preferably, an emulsifier consisting, for example, of ½% (based on sodium) of the dimer of linoleic acid may be added. After a short period of agitation, a test sample of the dispersion shows the particle size to be in the 5 to 15 micron range.

The stirring is stopped and the dispersion is allowed to cool to room temperature. This dispersion is now ready to be used in the selective dimerization. Inert liquids such as saturated dibutyl ether, normal octane, n-heptane, or straight run kerosene, may be employed as suspension media for the dispersion. Any such dispersion having sufficiently finely divided alkali metal such as sodium or potassium will suffice. Other well-known substances may be used instead of the dimeric linoleic acid as the dispersing agents.

The dispersion is added to the tether which is precooled to and maintained between −20 to −50° C. It is only necessary to employ an amount of dispersed alkali metal stoichiometrically equal to the appropriate reactant to be dimerized.

Following addition of the dispersion to the ether, the conjugated diene is added, preferably slowly and at approximately the same ratio as that at which it reacts with the alkali metal. For maximum reaction rates of dimerization, it is desirable to maintain constant agitation of the reaction mixture, the most effective agitation being obtained by carrying out the reaction in a pebble mill or similar mill suitable for wet grinding.

Under the aforesaid reaction conditions, the dialkali metal derivatives are rapidly and selectively formed and, generally, are formed as slurries of the dialkali metal derivative of the diene dimer in the reaction medium. These dimetallic derivatives can either be isolated as such, or, since they tend to be unstable and difficult to handle, they can be directly and immediately thereafter subjected to further reactions to form valuable derivatives. For example, and in the use of butadiene for the initial reaction, subsequent carbonation of the mixture yields the salts of $C_{10}$ dicarboxylic acids. The carbonation may be done, as aforesaid, by subjecting the dimetallo octadienes to dry gaseous carbon dioxide, by contact with solid carbon dioxide or by means of a solution of carbon dioxide. The temperature should be preferably controlled below 0° C. to minimize formation of undesired by-products. Carbonation forms the dimetallic salts of unsaturated aliphatic dicarboxylic acids containing two more carbon atoms than the dimetallic dimers from which they are produced. Thus, in the use of butadiene, there results by this method the selective production of the salts of $C_{10}$ unsaturated aliphatic dicarboxylic acids.

The reaction mixture comprising the aforesaid salts of the unsaturated $C_{10}$ aliphatic diacids can then be dehydrogenated to produce the corresponding salts of the saturated acids, including sebacic acid, 2,2'-diethyladipic acid and 2-ethylsuberic acid as aforesaid. Treatment of the hydrogenated mixture by means such as acidification results in production of the free $C_{10}$ acids.

For recovery of the desired $C_{10}$ diacids in substantially pure form from a process as aforedescribed, the treatment embodied herein may be carried out with mixtures of the unsaturated acids obtainable from the process. For example, in the aforesaid process, following carbonation of the disodiooctadienes, the carbonated product may be acidified to produce the corresponding free unsaturated acids. Such acids may then be subjected to the defined treatment for selective decarboxylation of undesired carboxylated materials to produce the desired unsaturated $C_{10}$ aliphatic diacids which may then be hydrogenated to the corresponding saturated diacids such as 2,2'-diethyladipic acid, 2-ethylsuberic acid and sebacic acid. In preferred embodiment, however, the treatment embodied herein is carried out with mixtures of the saturated acids primarily so as to avoid the possibility of occurrence of undesired reactions (e. g., polymerization) that unsaturated compounds may tend to undergo during heat treatments. Moreover, and although in the specific embodiment described hereinafter, the acid mixture subjected to the defined treatment comprises the acids recovered from the hydrocarbon phase in which they were dissolved in the acidification treatment to liberate the acids from their sodium salts, it is within the scope of this invention to subject, to the defined treatment for selective decarboxylation, the acid mixture in solution in suitable solvents, examples of which include toluene, xylene, benzene, and other aromatic hydrocarbons; polar solvents such as ethers, e. g., diethyl ether; esters, e. g., ethyl acetate, and the like.

Moreover, and as embodied herein, the defined treatment may be employed as a preliminary treatment, following which the mixture of acids, from which the undesired components have been selectively decarboxylated, may be subjected to fractional distillation for recovery of the desired acids in substantially pure form; or the mixture of acids containing material to be selectively decarboxylated may be subjected to treatment under the defined conditions in a simultaneous selective decarboxylation distillation treatment for recovery, in a single step operation, of the desired acids substantially free of the undesired carboxylated products originally present in mixture with the desired acids.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. A process for selective decarboxylation of carboxylated materials other than sebacic acid, 2-ethylsuberic acid and 2,2'-diethyladipic acid in a mixture containing said acids and carboxylated materials other than said acids, said mixture having been obtained by initial reaction between an alkali metal and butadiene to produce a reaction mixture comprised predominantly of dialkali metal derivatives of octadienes, carbonating said reaction mixture to produce a carbonated mixture comprised predominantly of dialkali metal salts of unsaturated $C_{10}$ aliphatic diacids, hydrogenating said mixture of metal salts of unsaturated acids to produce a mixture of the metal salts of the corresponding saturated acids, and acidifying said mixture of metal salts of saturated acids to liberate said saturated acids from their salts and provide a mixture comprised predominantly of sebacic acid, 2-ethylsuberic acid and 2,2'-diethyladipic acid and a small amount of carboxylated materials other than said acids, which comprises subjecting said latter mixture to an elevated temperature up to about 300° F. at a reduced pressure for a period of time sufficient to selectively decarboxylate said other carboxylated materials.

2. A process as defined in claim 1, wherein said latter mixture is subjected to a temperature of about 100 to about 300° F. and a pressure of about 10 to about 200 mm.

3. A process, as defined in claim 2, wherein the said latter mixture is subjected to a temperature of about 100 to about 300° F. and a pressure of about 10 to about 200 mm. for about five to about twenty minutes.

4. A process for selective decarboxylation of carboxylated materials other than aliphatic dibasic acids in a mixture containing said acids and said other carboxylated materials, said mixture having been obtained by initial reaction between an alkali metal and a conjugated diene to produce a reaction mixture comprised predominantly of dialkali metal derivatives of dimers of said diene, carbonating said reaction mixture to produce a carbonated mixture comprised predominantly of the dialkali metal salts of unsaturated aliphatic diacids containing two more carbon atoms per molecule than said dimers, hydrogenating said carbonated mixture to saturate the metal salts of the unsaturated acids, and acidifying the resulting mixture of saturated salts to liberate the saturated acids from their salts and provide a mixture comprised predominantly of the corresponding free saturated diacids and a small amount of carboxylated materials other than said diacids, which comprises subjecting said latter mixture to an elevated temperature up to about 300° F. at a reduced pressure for a period of time sufficient to selectively decarboxylate said other carboxylated materials.

5. A process for selective decarboxylation of carboxylated materials other than dibasic acids in a mixture containing said acids and said other carboxylated materials, said mixture having been obtained by initial reaction between an alkali metal and a conjugated diene to produce a reaction mixture comprised predominantly of dialkali metal derivatives of said diene, carbonating said reaction mixture to produce a carbonated mixture comprised predominantly of the dialkali metal salts of diacids containing two more carbon atoms per molecule than said derivatives, and acidifying said mixture of salts to liberate the acids from their salts and provide a mixture comprised predominantly of the corresponding diacids and a small amount of carboxylated materials other than said diacids, which comprises subjecting said latter mixture to an elevated temperature up to about 300° F. at a reduced pressure for a period of time sufficient to selectively decarboxylate said other carboxylated materials.

6. A process for selective decarboxylation of carboxylated materials other than sebacic acid, 2-ethylsuberic acid and 2,2'-diethyladipic acid in a mixture containing said acids and carboxylated materials other than said acids, said mixture having been obtained by initial reaction between finely dispersed sodium metal and butadiene to produce a reaction mixture comprised predominantly of disodiooctadienes, carbonating said reaction mixture to produce a carbonated mixture comprised predominantly of disodio metal salts of unsaturated acids containing two more carbon atoms per molecule than said disodiooctadienes, hydrogenating the resulting carbonated mixture to saturate the salts of the unsaturated acids, and acidifying the resulting saturated salt mixture to liberate the acids from their salts and provide a mixture comprising the corresponding free diacids and a small amount of carboxylated materials other than said diacids, which comprises subjecting said latter mixture to a temperature of from about 100 to about 300° F. at a pressure of from about 10 to about 200 mm. for a period sufficient to selectively decarboxylate said other carboxylated materials.

7. A process for selective decarboxylation of carboxylated materials other than dibasic acids in an acid mixture containing (1) sebacic acid and in major amount by weight a mixture of $C_{10}$ isomeric diacids including 2-ethylsuberic acid and 2,2'-diethyladipic acid and (2) carboxylated materials other than said diacids, said acid mixture having been obtained by initial reaction between finely divided sodium and butadiene to selectively produce an isomeric mixture of disodiooctadienes including the straight chain disodiooctadiene and branched chain isomers thereof and a small amount of other sodium hydrocarbons, reacting said mixture containing said disodiooctadienes with carbon dioxide to provide a carbonated mixture comprised predominantly of disodio salts of $C_{10}$ aliphatic unsaturated diacids, hydrogenating the resulting mixture of disodio salts to saturate the sodium salts thereby providing a mixture of the corresponding sodium salts, acidifying the resulting saturated salt mixture with a mineral acid to liberate the saturated acids from their sodium salts, said saturated acids comprising sebacic acid, 2-ethylsuberic acid and 2,2'-diethyladipic acid in mixture with a small amount of other carboxylated materials, separating a substantial amount of the sebacic acid from said mixture of saturated acids, and subjecting the resulting mixture comprised predominantly of 2-ethylsuberic acid and 2,2'-diethyladipic acid, sebacic acid, and said other carboxylated materials to a temperature of from about 100 to about 300° F. at a pressure of from about 10 to about 200 mm. for a period of from about five to about twenty minutes to selectively decarboxylate said other carboxylated materials.

References Cited in the file of this patent

UNITED STATES PATENTS

| | | |
|---|---|---|
| 2,352,461 | Walker | June 27, 1944 |
| 2,716,662 | Cohen et al. | Aug. 30, 1955 |
| 2,734,914 | McKinnis | Feb. 14, 1956 |
| 2,749,364 | Greenberg | June 5, 1956 |

FOREIGN PATENTS

| | | |
|---|---|---|
| 1,093,096 | France | Nov. 17, 1954 |

U. S. DEPARTMENT OF COMMERCE

PATENT OFFICE

CERTIFICATE OF CORRECTION

Patent No. 2,837,564     Raymond Wynkoop et al.     June 3, 1958

It is hereby certified that error appears in the printed specification of the above numbered patent requiring correction and that the said Letters Patent should read as corrected below.

Column 3, line 5, for "metheylbutadiene" read -- methylbutadiene --; line 20, for "withing" read -- within --; line 26, for "50°" read -- 50% --; column 4, line 60, for "subject" read -- subjected --; column 6, line 15, for "tether" read -- ether --.

Signed and sealed this 5th day of August 1958.

(SEAL)
Attest:
KARL H. AXLINE
Attesting Officer

ROBERT C. WATSON
Commissioner of Patents